Nov. 26, 1946.  E. E. SENSEL  2,411,760
METHOD AND APPARATUS FOR CATALYTIC CONVERSION
Filed April 13, 1944
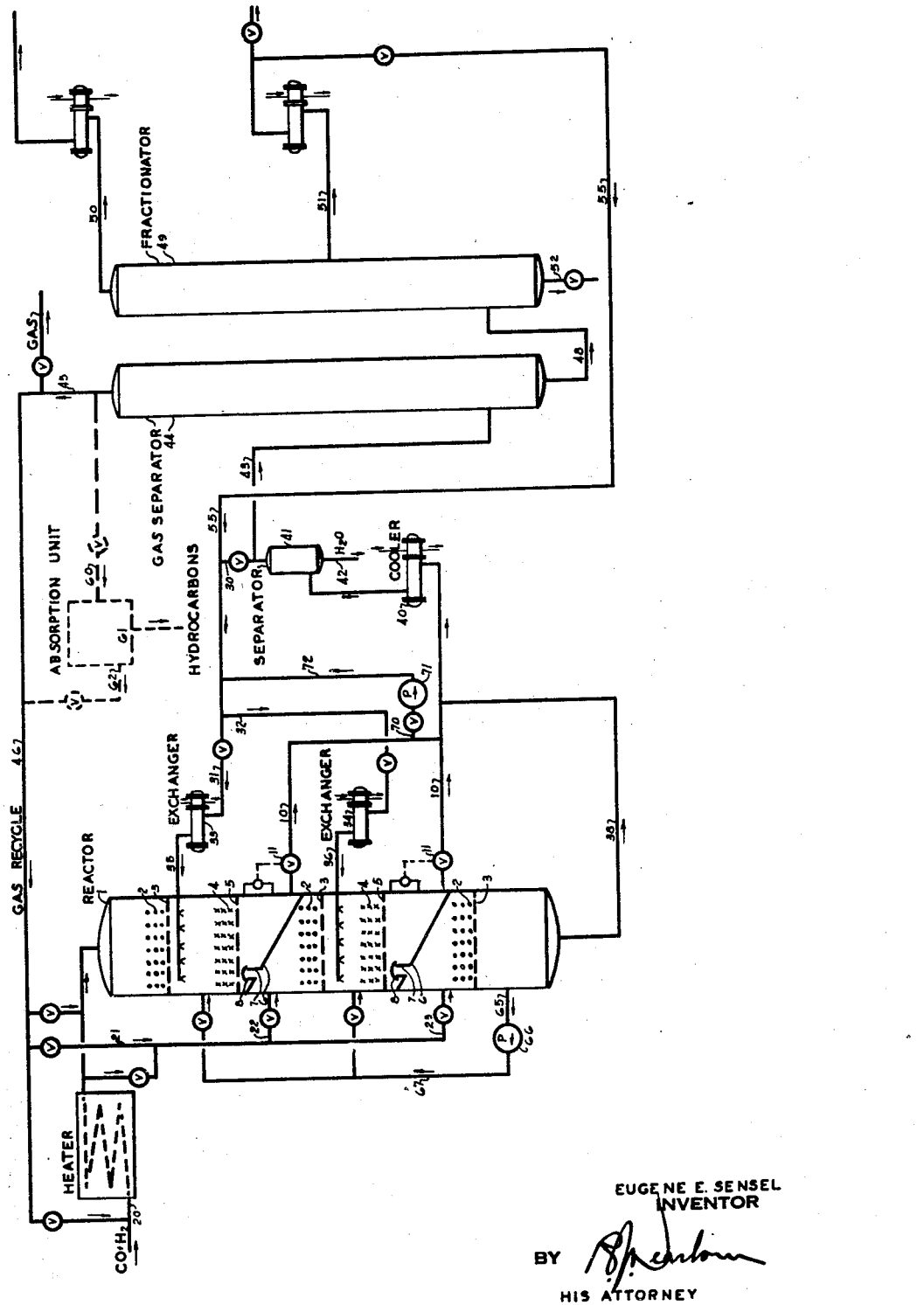
EUGENE E. SENSEL
INVENTOR
BY
HIS ATTORNEY Patented Nov. 26, 1946

2,411,760

UNITED STATES PATENT OFFICE 2,411,760

METHOD AND APPARATUS FOR CATALYTIC CONVERSION

Eugene E. Sensel, Beacon, N. Y., assignor, by mesne assignments, to The Texas Company, New York, N. Y., a corporation of Delaware Application April 13, 1944, Serial No. 530,844

5 Claims. (Cl. 260—449.6)

This invention relates to a method of and apparatus for effecting catalytic conversions such as the hydrogenation of oxides of carbon to produce valuable products.

The invention has particular application in conversion reactions of highly exothermic nature and wherein it is important to maintain the reaction temperature within predetermined limits.

In accordance with the invention an oxide of carbon is hydrogenated by the action of a solid granular catalyst for the production of compounds having two or more carbon atoms per molecule. It involves effecting the reaction in a reaction tower in which the reactants, in gaseous or vaporous form, flow through alternate catalyst zones and cooling zones, the cooling zones advantageously having provision for washing or scrubbing of the reactants.

More specifically, the reaction tower has a plurality of separate beds of solid granular catalyst spaced apart one above the other with an intervening screen or porous bed of non-catalytic material in the spaces between adjacent catalytic beds. A receptacle is provided between the non-catalytic material and the catalyst bed immediately below, the receptacle being adapted to receive and collect descending liquid without preventing the flow of vapor through the tower. The liquid collecting in each receptacle is discharged directly from the tower. In this way the vapors and gases passing to the succeeding catalyst bed or zone are substantially free from liquid. A gaseous stream of carbon monoxide and hydrogen is continuously passed through the foregoing beds in succession, the catalyst beds being maintained under conversion conditions such that the oxide of carbon is hydrogenated to produce compounds having two and more carbon atoms per molecule. A cooling liquid in finely dispersed form is introduced to the reaction tower in the zones intervening succeeding catalyst beds. The introduced liquid commingles with the gas stream flowing through the tower and the commingled mixture flows through the non-catalytic bed or screen during which the reactant stream undergoes cooling.

Thereafter the cooling liquid now raised in temperature, together with liquid products that may be present, accumulates in the receptacle while the gaseous stream of reactants continues to flow toward the next bed of catalytic material.

Provision is made for continuously withdrawing cooling liquid from the receptacle as it accumulates therein so as to prevent it from overflowing to the catalyst bed below. The withdrawn liquid, or any portion or fraction thereof, may be cooled and recycled to the reaction tower.

It is also contemplated that the cooling liquid may be introduced in sufficient amount and at such a temperature as to effect liquefaction or condensation of higher molecular weight constituents of the reactant mixture flowing through the tower. The liquefied constituents are thus continuously drawn off with the cooling liquid and so removed from the reaction tower.

As a result of removal of liquefiable constituents at succeeding stages the concentration of reactants in the gas is progressively less so that the time of contact with the catalyst is correspondingly increased in succeeding catalyst beds or zones.

The present invention avoids conditions which give rise to flooding of the catalyst beds with liquid. By employing downflow through the catalyst beds heavy products of reaction, which would otherwise adhere to the catalyst particles, are continuously and effectively swept out of the mass into the cooling and scrubbing zone. This heavy material is removed from the tower as soon as it is removed from each catalyst mass. Thus, the catalyst mass is maintained in comparatively dry and in a highly active condition for a greater length of time. Having the catalyst free of liquid permits greater diffusion of gaseous reactants into the active centers.

It has been proposed heretofore to control temperatures by introducing cooling fluids to the reaction zone. Such operations, however, have involved direct contact between the cooling fluid and the active catalytic agent. The passage of cooling liquid through a catalyst bed is objectionable from the standpoint of decreasing the overall capacity of the reaction tower as well as hindering diffusion of the reaction gases into the catalyst.

In U. S. Patent 2,256,622, granted to Murphree and Peck, it has been proposed to maintain pools of cooling liquid on bubble trays placed above each catalyst bed in a reaction tower, but this arrangement is objectionable because it involves overflow of cooling liquid from the trays to the catalyst bed immediately below. Heavy liquid hydrocarbons produced in the synthesis do not have an opportunity to drain off since they tend to be forced in an upwardly direction by the upflow of gases, which frequently leads to flooding.

In order to describe the invention reference will now be made to the accompanying drawing.

As indicated in the drawing, numeral I designates a vertical reaction tower containing a plurality of beds of solid granular catalyst 2. The catalytic material is supported on perforated trays 3.

The numeral 4 refers to beds of non-catalytic material also supported on perforated trays 5.

The non-catalytic material may comprise Raschig rings, solids or other inactive material, in the form of lumps, granules, saddles, etc. Screens formed from metallic material and adapted to effect intimate contact and mixing of fluid materials flowing therethrough may be employed.

Suitable catalysts for effecting reaction between carbon monoxide and hydrogen for the production of normally liquid hydrocarbons comprise either cobalt, iron, or nickel together with a promoter such as the oxides of thorium, magnesium, uranium, and vanadium, on a supporting material such as diatomaceous earth, silica gel, clays, etc.

Beneath each tray 5 is a receptacle 6. The receptacles comprise a partition, pan, or tray, with riser pipe 7, each riser being surmounted by a baffle plate 8. There may be a plurality of risers in each receptacle.

The purpose of the baffles 8 is to prevent liquid descending from the tray 5 falling through the risers 7 and thus descending to the catalyst bed below the receptacle. At the same time the risers 7 permit passage of vapors from one bed to the next.

A discharge pipe 10 communicates with the lowest portion of each receptacle through which liquid accumulating in the receptacle is continuously drawn off and removed from the reaction tower. The discharge pipes 10 are advantageously provided with control valves 11. These valves may be automatically controlled by float control means in each receptacle so as to maintain a liquid level on each receptacle sufficiently low to prevent the liquid overflowing through the riser pipes 7.

In operation the reactant gases, carbon monoxide, and hydrogen are drawn from a source not shown through a pipe 20 in the proportion of about 1 mol of carbon monoxide to 2 mols of hydrogen. The feed gases are advantageously preheated to a temperature of about 300 to 360° F., or in some cases up to 450 to 480° F., depending on the type of catalyst employed. The heated gases flow into the top of the tower, although provision may be made for introducing the heated feed gases at succeeding points in the tower, in which case the feed gases in the desired amount are by-passed through a branch pipe 21, which in turn feeds branch pipes 22 and 23.

During passage of the feed gases through the catalyst beds 2, carbon monoxide and hydrogen react to form hydrocarbon compounds with liberation of considerable heat so that the reactant mixture and also the catalyst bed tend to rise in temperature. It is desirable to prevent the catalyst bed temperatures from exceeding by about 5–10° F. the optimum operating temperature required for a given synthesis catalyst under a given set of conditions.

Cooling liquid which may be a higher boiling fraction of the final product is drawn from a source, which will be described later, through a pipe 30. The pipe 30 communicates with branch pipes 31 and 32 which in turn lead to heat exchangers 33 and 34 respectively.

Thus the cooling liquid upon passage through the exchanger 33 is brought to a sufficiently low temperature, for example in the range of 10 to 100° F. or higher, below the optimum temperature desired in the succeeding catalyst bed so as to provide the necessary cooling effect upon introduction to the reaction tower. This temperature will depend on the rate at which cooling liquid is introduced. That is, the temperature and amount of liquid are interrelated and a change in one is correlated with a change in the other to secure the desired cooling effect.

The cool liquid is introduced through a pipe 35 located within the reaction tower which is below the perforated tray 3. The sprayed liquid commingles with the downflowing stream of reactant vapors and the mixture passes through the contact material 4 which effects intimate mixing between the cooling liquid and reactants.

After passage through the perforated tray 5, the reactant vapors pass through the riser pipe 7 while the liquid is separated from the vapor and accumulates in the receptacle 6. The accumulated liquid is drawn off through the pipe 10.

Cool reactant vapor reduced to a temperature of about 380° F., in the case of a cobalt type catalyst, then passes through the succeeding catalyst bed following which it is again brought into contact with a spray of cooling liquid introduced through the spray pipe 36.

There is a temperature gradient through each catalyst bed. Thus the vapors may enter a bed at about 380° F. and leave at about 420° F.

The resulting mixture of vapor and cooling liquid then passes through the succeeding bed of contact material into the space above the succeeding receptacle 6. Here again the liquid is separated from the vapors and withdrawn through the succeeding pipe 10 while the vapors pass on to the succeeding catalyst bed 2.

After passage through the final catalyst bed in the bottom of the reaction tower 1, the reactant mixture is continuously drawn off through the pipe 38.

The effluent streams drawn off from the pipes 10 and pipe 38 are brought together and passed through a cooler 40 from which they are discharged into a separator 41. Water formed as a by-product in the conversion reaction is permitted to separate in the separator 41 and is withdrawn and flows through pipe 42.

The hydrocarbons and gas included in the reactant gas are drawn off through a pipe 43 to a gas separator 44.

The non-reactant gases are drawn off through a pipe 45 and may be recycled, all or in part, through a branch pipe 46 to the reaction tower, or may be converted to CO and $H_2$ for recycling to the synthesis reaction.

The normally liquid hydrocarbons produced in the reaction together with the cooling liquid from the receptacles are drawn off through a pipe 48 and pass to a fractionator 49 wherein they may be fractionated into fractions of any desired boiling range. Thus a distillate fraction comprising relatively low boiling material is drawn off through the top of the tower through a pipe 50. Such fraction may comprise hydrocarbons boiling within the naphtha range.

A somewhat higher boiling fraction comprising kerosene and gas oil is removed as a side stream through pipe 51 while still higher boiling hydrocarbons are removed as a residual fraction through pipe 52.

A portion of either the intermediate fraction or the highest boiling residual fraction or a suitable blend of these two fractions may be recycled through pipe 55 communicating with the previously mentioned pipe 30 to provide the cooling liquid. The fractionating unit 49 can be operated so as to produce a fraction suitable for the cooling liquid and this fraction may boil in the range of about 500 to 600° F. If desired the cooling liquid may comprise in part liquid constituents which are vaporizable under the conditions of reaction prevailing in the tower, thereby dissipating some of the exothermic heat as heat of vaporization.

Instead of using a fraction of the product for the cooling liquid, it is contemplated that other classes of compounds may be used for this purpose such as high boiling solvent liquids. As for example, various high boiling alcohols, ethers, ketones, anthracene oil and other normally liquid compounds which are not capable of injuring the catalyst.

Mention has been made of recycling the gases removed through the pipe 45 from the gas separator. Since these gases may contain substantial amounts of gaseous hydrocarbons, provision may be made for effecting removal of these hydrocarbons by absorption in charcoal or absorption liquid. This may be accomplished by passing the gas stream from the pipe 45 through a branch pipe 60 to an absorption unit 61. The residual gas from which hydrocarbons have been separated is discharged through a pipe 62 which communicates with the previously mentioned pipe 46.

Provision may also be made for recycling of reactant gas through the reaction tower or through any portion thereof. Thus, a stream of reactant gas issuing from the final catalyst bed may be drawn off through a pipe 65 and forced by a blower 66 into a pipe 67 which discharges into branch pipes leading to intermediate points in the tower. In this way the recycled gas may be returned at different points in the reaction tower.

Provision may be made for recycling directly the liquid drawn off from the receptacle 6 before passing to the separator 41. As indicated in the drawing, pipes 10 communicates with a pipe 70 and circulating pump 71 by which means the liquid is discharged through a pipe 72 into the pipes 31 and 32.

Mention has been made of charging carbon monoxide and hydrogen in the proportion of 1 mol carbon monoxide to 2 mols of hydrogen. Such proportions are desirable when employing a cobalt type of catalyst. However, other proportions may be used and will depend upon the catalyst employed. For example, with an iron type of catalyst the feed mixture may comprise 1 mol of carbon per mol of hydrogen.

Also, operating conditions may be such as to produce a large yield of normally gaseous hydrocarbons such as butylenes and isobutane.

The absorption unit 61 may be operated so as to absorb $C_3$ and higher hydrocarbons from the gas so that the residual gas recycled through pipe 62 is largely free of such hydrocarbons.

Obviously many modifications and variations of the invention as above set forth may be made without departing from the spirit and scope thereof, and therefore only such limitations should be imposed as are indicated in the appended claims.

I claim:

1. In the catalytic conversion of carbon monoxide and hydrogen into compounds of higher molecular weight by contact with a solid synthesis catalyst, the process that comprises passing a gaseous stream containing carbon monoxide and hydrogen downwardly through a plurality of separate porous beds of synthesis catalyst in solid particle form in series and spaced a substantial distance apart from each other within the tower, disposing in intervening spaces between catalyst beds a porous bed of non-catalytic solid particles through which vapors pass flowing from an upper catalyst bed to a lower catalyst bed, maintaining said catalyst zones at a predetermined elevated temperature effective for conversion, effecting substantial conversion of carbon monoxide and hydrogen into higher molecular weight compounds with evolution of heat during passage in contact with the catalyst, flowing liquid coolant obtained from without said tower through each non-catalytic bed in intimate contact with said vapors to effect cooling and in sufficient amount and at such temperature as to effect liquefaction of the higher molecular weight constituents of the reaction mixture, separating liquid from the vapors after passage through each non-catalytic bed and prior to passage through its succeeding catalyst bed in the direction of gas flow, withdrawing separated liquid from below each non-catalytic bed, regulating the amount of liquid withdrawn so as to prevent liquid overflow to a succeeding catalyst bed, and conducting resulting cooled vapors substantially free from liquid from a preceding non-catalytic bed to its succeeding catalytic bed in the direction of gas flow.

2. In the catalytic conversion of carbon monoxide and hydrogen into compounds of higher molecular weight by contact with a solid synthesis catalyst, the process that comprises passing a gaseous stream containing carbon monoxide and hydrogen downwardly through a plurality of beds of solid particles in series, said beds being alternately catalytic and non-catalytic and spaced a substantial distance apart in the direction of gas flow through the tower, effecting conversion of carbon monoxide and hydrogen into higher molecular weight compounds with evolution of heat during passage of carbon monoxide and hydrogen through said catalyst beds, injecting finely-dispersed liquid coolant into the vapors passing from a preceding catalyst bed to its succeeding non-catalytic bed, passing vapors and dispersed coolant through said non-catalytic bed in the presence of each other, correlating the flow and temperature of said coolant such as to effect removal of exothermic heat and cooling of the vapors and liquefaction of the higher molecular weight constituents of the reaction mixture, abruptly deflecting the direction of flow of vapors issuing from beneath each non-catalytic bed so as to disengage said vapors from liquid coolant associated therewith, conducting deflected vapors substantially free from liquid to a succeeding catalytic bed, separately withdrawing from below each non-catalytic bed liquid from which vapors have been disengaged, regulating said liquid withdrawal so as to prevent liquid overflow to a succeeding catalyst bed.

3. In the catalytic conversion of carbon monoxide and hydrogen into compounds of higher molecular weight by contact with a solid synthesis catalyst, the process that comprises passing a gaseous stream containing carbon monoxide and hydrogen downwardly through a plurality of beds of solid particles in series, said beds being alternately catalytic and non-catalytic and spaced a substantial distance apart in the direction of gas flow through the tower, effecting conversion of carbon monoxide and hydrogen into normally liquid compounds with evolution of heat during passage of carbon monoxide and hydrogen through said catalyst beds, injecting finely-dispersed liquid coolant into the vapors passing from a preceding catalyst bed to its succeeding non-catalytic bed, passing vapors and dispersed coolant through said non-catalytic bed in the presence of each other, correlating the flow and temperature of said coolant such as to effect removal of exothermic heat and cooling of the vapors, said coolant being a scrubbing liquid for the higher molecular weight constituents of the reaction mixture and being introduced in sufficient amount and at such temperature as to effect substantial liquefaction of normally liquid products of reaction as a result of contact with said coolant, abruptly deflecting the direction of flow of vapors issuing from beneath each non-catalytic bed so as to disengage said vapors from liquid associated therewith, conducting deflected vapors substantially free from liquid to a succeeding catalytic bed, separately withdrawing from below each non-catalytic bed liquid from which vapors have been disengaged, regulating said liquid withdrawal so as to prevent liquid overflow to a succeeding catalyst bed.

4. The process, as defined in claim 1, wherein the liquid coolant and liquefied reaction products separated from the said vapors are treated for the recovery of hydrocarbon fractions.

5. A process, as defined in claim 1, wherein the coolant comprises a liquid which, at least in part, comprises constituents vaporizable under the conditions prevailing during contact with said vapors and operable thereby to dissipate at least some of the exothermic heat as heat of vaporization.

EUGENE E. SENSEL.